(12) United States Patent
Twinkwalder et al.

(10) Patent No.: US 7,401,135 B2
(45) Date of Patent: Jul. 15, 2008

(54) SYSTEM AND METHOD FOR ANALYZING AND GENERATING SUPPLEMENTARY SERVICE DATA UNITS IN PACKET BASED MULTIMEDIA COMMUNICATIONS SYSTEMS

(75) Inventors: Florian Twinkwalder, San Jose, CA (US); Mark E. Clark, San Jose, CA (US); Mark Skrzynski, Capitola, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 692 days.

(21) Appl. No.: 09/745,091

(22) Filed: Dec. 19, 2000

(65) Prior Publication Data

US 2002/0030696 A1 Mar. 14, 2002

Related U.S. Application Data

(63) Continuation-in-part of application No. 09/586,408, filed on Jun. 1, 2000, now abandoned.

(51) Int. Cl.
*G06F 15/173* (2006.01)
*G06F 15/177* (2006.01)

(52) U.S. Cl. ............... 709/223; 709/220; 709/227; 370/352; 370/401

(58) Field of Classification Search ......... 709/220–224, 709/227–230; 370/351–356, 400–401, 469, 370/522
See application file for complete search history.

(56) References Cited

U.S. PATENT DOCUMENTS

| | | | |
|---|---|---|---|
| 6,161,134 A * | 12/2000 | Wang et al. .................. 709/220 |
| 6,266,782 B1 * | 7/2001 | Carter et al. .................... 714/4 |
| 6,430,699 B1 * | 8/2002 | Carter et al. .................... 714/4 |
| 6,449,260 B1 * | 9/2002 | Sassin et al. .................. 370/352 |
| 6,614,784 B1 * | 9/2003 | Glitho et al. .................. 370/352 |
| 6,693,898 B1 * | 2/2004 | Su et al. ...................... 370/355 |
| 6,763,093 B2 * | 7/2004 | Lumsden ................. 379/88.22 |
| 6,859,448 B1 * | 2/2005 | Roy ............................ 370/338 |
| 6,868,090 B1 * | 3/2005 | Ma et al. ..................... 370/469 |
| 7,006,487 B1 * | 2/2006 | Ma et al. ..................... 370/352 |
| 7,031,279 B2 * | 4/2006 | Lee et al. .................... 370/331 |

* cited by examiner

*Primary Examiner*—Bharat Barot

(57) ABSTRACT

A supplementary service, such as H.450 in a specific embodiment, test client is provided. The H.450 test client can send and receive H.450 application protocol data units in any H.225 message. The test client allows for the setting of desired H.450 parameters and allows for the display of the H.450 message itself.

12 Claims, 14 Drawing Sheets

SYSTEM AND METHOD FOR ANALYZING AND GENERATING SUPPLEMENTARY SERVICE DATA UNITS IN PACKET BASED MULTIMEDIA COMMUNICATIONS SYSTEMS

CROSS REFERENCE TO RELATED APPLICATIONS

This application is a continuation-in-part of commonly owned U.S. patent application Ser. No. 09/586,408, filed Jun. 1, 2000, and titled "System and Method for Sending Messages Defined by an ASN.1 Structure from an Application to the Signaling Entity and Vice Versa Via a Tree Structured Text String," now abandoned which is hereby incorporated by reference in its entirety as if fully set forth herein.

RESERVATION OF COPYRIGHT

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records available to the public, but otherwise reserves all copyright rights whatsoever.

BACKGROUND OF THE INVENTION

1. Field of the Invention

The present invention relates to telecommunication systems and, particularly, to a system and method for sending messages from an application to signaling entities and, for particular embodiments, the sending of APDUs between H.323/H.450 endpoints.

2. Description of the Related Art

The Abstract Syntax Notation One (ASN.1), described in the International Telecommunications Union (ITU) X.680 and X.691 specifications, defines a data structure protocol for describing messages to be exchanged between distributed computer systems. ASN.1 defines data units independently of system architecture. Because of this, ASN.1 is used to generate programming language code that forms the core of a wide variety of messaging systems applications, including ITU-T Recommendation H.323.

The ITU-T Recommendation H.323 is a group of specifications defining the operation of a multimedia communication system over packet networks. The ITU-T Recommendation H.323 specifies H.245 control signaling for negotiation of media channel usage, Q.931 (H.225.0) for call signaling and call setup, H.225.0 Registration, Admission, and Status (RAS), H.450 for supplementary services, and RTP/RTCP for sequencing audio and video packets. An exemplary system implementing the Recommendation H.323 is the HiPath™ 5500 system, available from Siemens Information and Communication Networks, Inc.

H.323-based systems use ASN.1 coded messages and protocol state machines for describing the application protocol data units (APDU) or packets of data used for signaling between H.323 endpoints, servers, gateways, and gatekeepers.

The processing of H.323 ASN.1 messages is typically implemented in a protocol stack, and its functions are accessed by application programs through application programming interfaces (API). The software primitives of the APIs are typically written with programming languages, such as C, C++, and Java, and all the associated parameters are expressed and declared in the corresponding language.

Whenever new features, such as new parameters or completely new supplementary services are added to the protocol stack of a software product, such as an H.323 application, software changes must be done in three layers: new functional entities must be added to the protocol stack; new parameters or programming primitives must be added to the API; and applications and their user interfaces must be changed or enhanced to allow user access to the new features. Each operation carried out by the new feature must be callable via an API that must be explicitly exported to the application. The changes must be made at the source code level, and the new software system must be recompiled and linked together and loaded to the customer's target system.

Thus, changes and additions to the software require replacement of the software in the target system. While software can be downloaded remotely, an interruption of the target system's operation occurs, which can hinder the simple "plugging in" of new features to the system.

Moreover, unless the API is modified, the application cannot access new features. Thus, even relatively small changes and additions to the signaling protocols and related protocol stacks require relatively high development effort, since the API source code must be modified.

Therefore, there is a need for an improved method for updating the protocol stack of an API based software product. There is particularly a need for an improved method for updating the processing of ASN.1 messages in an H.323 telecommunications system.

Further, as is known, H.225 messages are used for call signaling to establish a connection between endpoints. Initially, an H.225.0 RAS (registration, admission, status) channel is established between an endpoint and a gatekeeper (in the gatekeeper-routed call model). After the RAS signaling channel is established, an H.225.0 call signaling channel is established between endpoints. H.225.0 call signaling messages include SETUP, ALERTING, CONNECT, RELEASE COMPLETE, and FACILITY. The user-user information element of an H.225 message can carry an H.450 APDU (application protocol data unit) for H.450 supplementary services. Such services are call-related services beyond the basic call and can include Call Forwarding, Call Transfer, Call Waiting, Message Waiting Indication, Conference, and the like.

As can be appreciated, newly implemented H.450 supplementary service features must be tested with all possible normal and exceptional events. To perform these tests, various H.450 messages must be sent and received by the endpoints. As such, there is a need for a system and method for sending, receiving, and displaying such test messages.

SUMMARY OF THE INVENTION

These and other problems in the prior art are overcome in large part by a system and method according to the present invention. According to the present invention, signaling messages and parameters that are defined by an ASN.1 structure are sent as a tree-structured text string from an application to a signaling entity (SE) and vice versa. As new signaling entities are added to support new features, the features can receive and send primitives without the programmer having to change or expand the API.

According to an implementation of the present invention, application programming interfaces (APIs) are provided which implement a first recursive function for interpreting text strings representative of ASN.1 structures for communicating with an application program. A second recursive function receives and interprets ASN.1 value trees from signaling entities (SE).

According to an implementation of the invention, an H.450 test client is provided. The H.450 test client can send and receive H.450 application protocol data units in any H.225 message. The test client allows for the setting of desired H.450 parameters and allows for the display of the H.450 message itself.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1-14 illustrate an improved system and method according to the present invention. A first implementation is a system and method for configuring a communication system with system updates without having to recompile associated application programming interfaces. In a second implementation, an H.450 test client is provided. The H.450 test client can send and receive H.450 application protocol data units in any H.225 message. The test client allows for the setting of desired H.450 parameters and allows for the display of the H.450 message itself.

ASN.1 Text Strings

Figure 1:
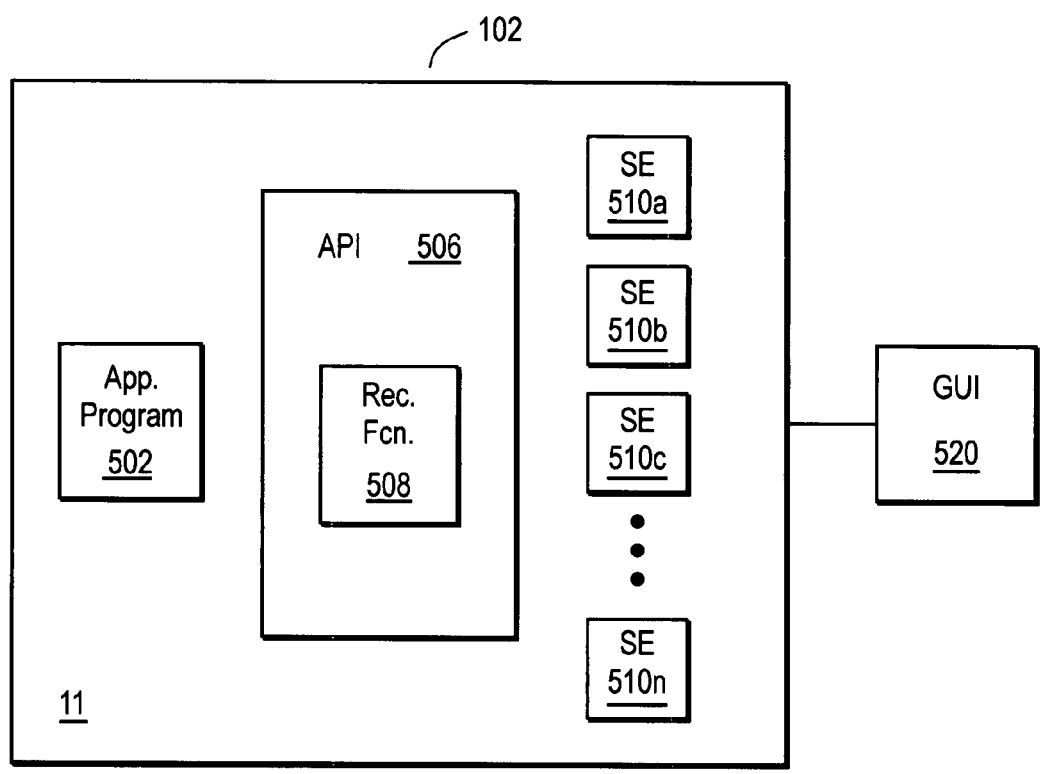
FIG. 1 is a block diagram illustrating an implementation of the present invention.

An exemplary computer system implementing a communication system according to an implementation of the invention is shown in FIG. 1. As will be described in greater detail below, the system 102 may be embodied as an H.323 terminal. In particular, the system may be embodied as a personal computer, such as an x86 compatible personal computer or an Apple Macintosh G4. The computer 102 includes a processor 11 adapted to implement computer code according to the present invention. Further, according to an implementation of the present invention, the processor 11 implements an operating system (not shown) for generating a graphical user interface (GUI) 520 to control system operation.

As shown in FIG. 1, an application program 502, such as a telephony application, one or more APIs 506, and one or more signaling entities 510a-510n are resident. As will be explained in greater detail below, the APIs 506 implement recursion functions 508 that allow ASN.1 text strings to be passed to the application 502 and the signaling entities 510. Thus, as will be explained in greater detail below, when upgrading the system, i.e., when new signaling entities are provided, the APIs need not be altered.

Figure 2:
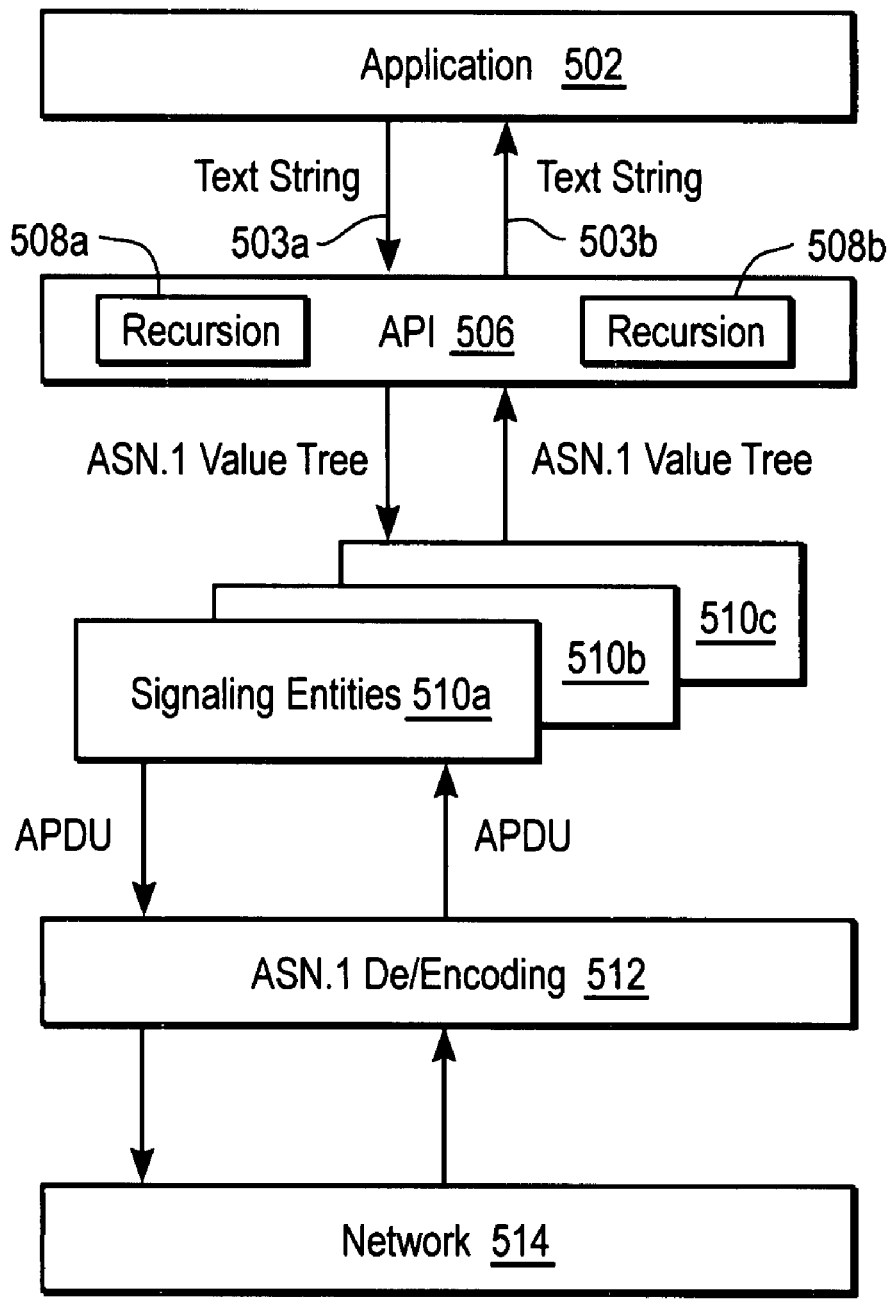
FIG. 2 is a functional diagram illustrating an implementation of the present invention.

More particularly, FIG. 2 is a functional diagram of the system according to the present invention. The system includes an application program 502, such as a telephony program. The application program 502 communicates via text strings 503a, b with one or more APIs 506, as will be explained in greater detail below. The text strings 503a,b contain the ASN.1 tree structure of the message and the corresponding values.

The ASN.1 tree structure is defined in terms of "valuetrees" and "syntaxtrees." The syntaxtree is static and contains the syntax of all possible information elements of a message structure. The valuetree is dynamic and contains all information elements that exist for a specific message. The value tree also contains the values of the various fields.

In one implementation, the structure of the message, i.e., the syntaxtree is provided to the application program 502 ahead of time. In that case, although the application 502 and the corresponding signaling entity 510 must be updated in order to add new features, the API 506 remains the same.

In an alternate implementation, the structure and syntax of the message are provided to the application program 502 from the stack (not shown). In that case, the application program 502 will first call the corresponding API to retrieve the syntaxtree structure for the message from the stack. In this case, to add new features, both the application program 502 and the API 506 could be left unchanged. The only change then required to the system is new signaling entity script.

In operation, a first recursive function 508a receives the syntaxtree text strings 503a, fills in the valuetrees, and passes them to one or more signaling entities 510. The signaling entities may be any entities adapted to generate encodeable data according to specified functions. In particular, the signaling entities 510 may be embodied as H.450 signaling entities. Such signaling entities include the Message Waiting Indication (MWI), Call Transfer, Call Diversion, Call Hold, Call Waiting Call Completion, Call Pickup, and Number Identification signaling entities. The signaling entities 510 may be implemented in protocol description language (PDL) scripts. Further details on PDL scripts are available from Radvision, Ltd. The PDL scripts contain the state machine code of the signaling entities and also implement machines arranged in a tree structure.

In turn, the signaling entities 510 communicate their respective APDUs (application protocol data unit) for ASN.1 encoding/decoding 512. The ASN.1 encoded octet strings are then provided onto the network 514.

When messages are received from the network, the ASN.1 octet strings are decoded, and the corresponding APDUs are provided to the appropriate signaling entities 510. The APIs 506 then receive the message values from the signaling entities 510, interpret them using a second recursion function 508b, and pass them as text strings to the application.

Figure 3:
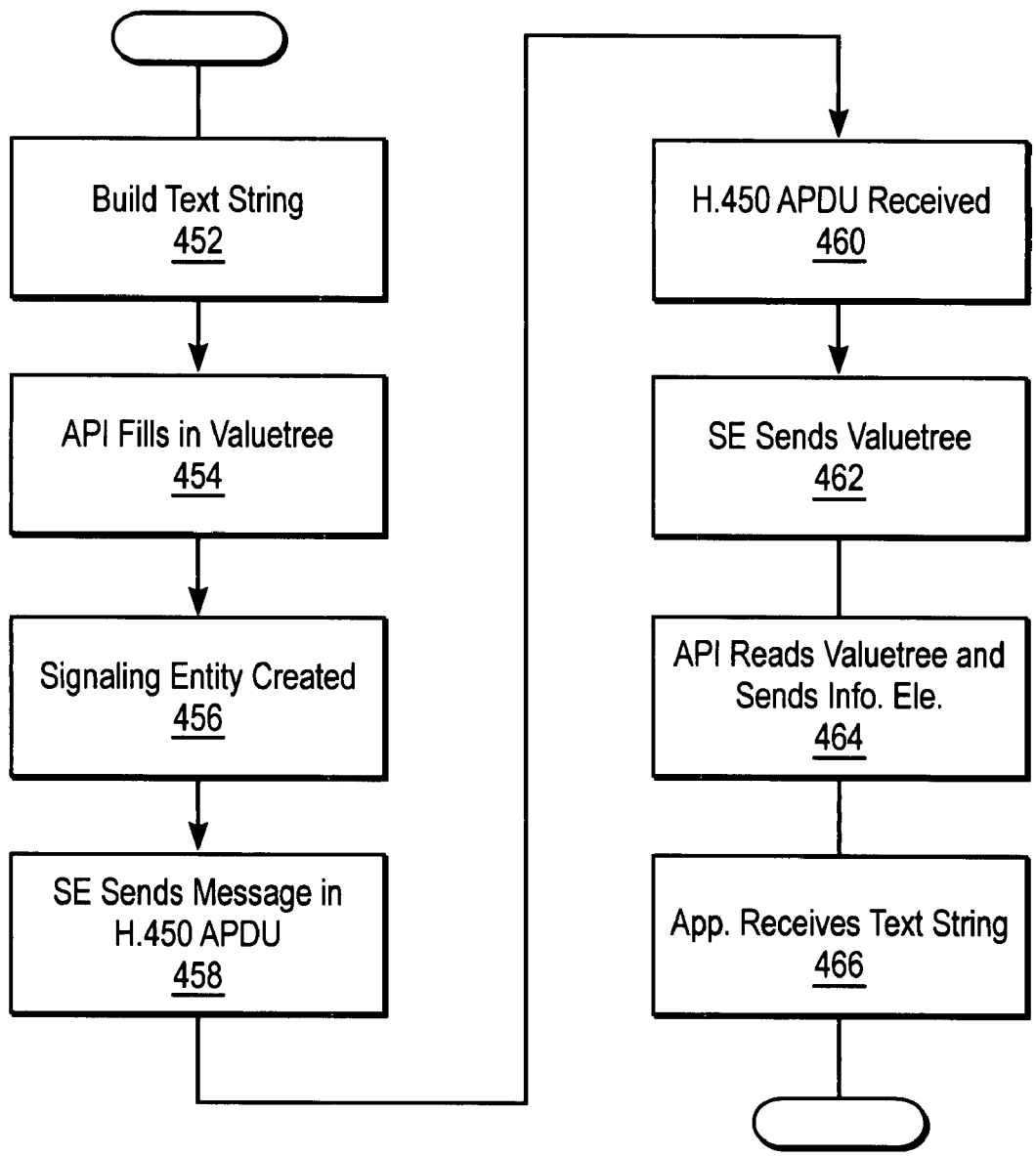
FIG. 3 is a flowchart illustrating an implementation of the present invention.

Operation of an embodiment of the invention is illustrated with reference to the flowchart of FIG. 3. In a step 452, an application program 502 builds up a tree-structured text string, i.e., the valuetree, for a message, such as an H.450 message. In a step 454, the API 506 receives the valuetree string and fills the information elements into the valuetree. In a step 456, the appropriate signaling entity 510 is created according to the operation in the message. In a step 458, the signaling entity sends the message in an H.450 APDU over the network. In a step 460, the H.450 APDU is received from the network by the receiving party at its corresponding remote signaling entity. In a step 462, the remote signaling entity sends the message's valuetree to its API. In a step 464, the API reads out the valuetree and sends the information elements to the application program in a tree-structured text string. Finally, in a step 466, the application program receives the tree-structured text string and processes the information elements.

Figures 4, 7:
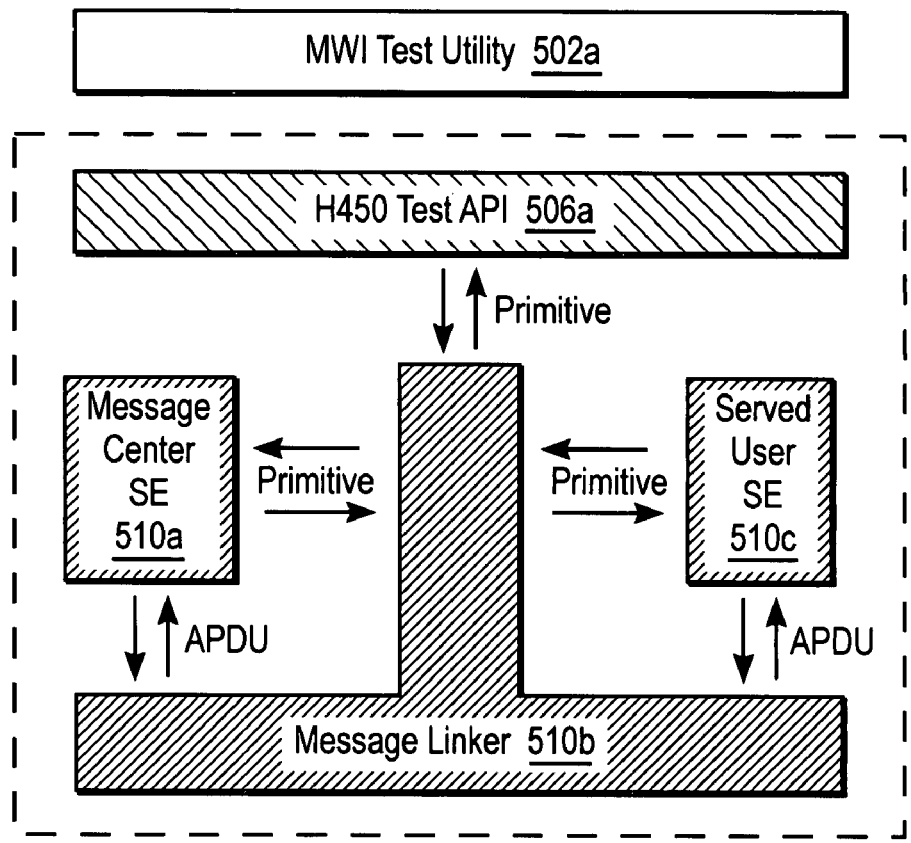
FIG. 4 is a functional diagram of an implementation of the present invention.
FIG. 7 is a diagram of another aspect of the graphical user interface of FIG. 6.

Operation of a particular implementation of the present invention may be illustrated by way of a specific example. According to a specific embodiment, code implementing the example follows as an Appendix. Shown in FIG. 4 is a software model of the example. The model includes an MWI Test Utility 502*a*, i.e., Application Program. The Message Waiting Test utility 502*a* tests the H.450 message waiting indication supplementary service. The Message Waiting supplementary service indicates on the served user that messages are waiting on the message center.

The model also includes an H.450 Test API 506*a*, a Message Center Signaling Entity 510*a*, a Served User Signaling Entity 510*c*, and a Message Linker 510*b*. To signal the relevant information over the network, APDUs with activation, deactivation, and interrogation operations are sent to and received from the network by the Served User Signaling Entity 510*c* and the Message Center Signaling Entity 510*a*.

The Message Linker 510*b* functions to provide a distribution process by determining to which signaling entity a specific text primitive or APDU is to be sent. That is, messages are sent to and received from the signaling entities 510*a* via the Message Linker 510*b*.

As seen in the Appendix, the H450 Test API 506*a* employs the files H450api.c, H450api.h, and H450struct.h. The Supplementary Service employs the files MWI.pdl and MWI-operations.asn. The H450 Test API implements initAPI, setCallback, initH450Root, and endH450Root initialization and termination functions. The initAPI function initializes the API. The setCallback function sets the callback. The initH450Root creates and initializes, and the end450Root function terminates, the H450 root protocol.

As is known, when a PDL state machine is executed, the resulting data structure is called a "process." As the PDL engine executes the state machines, the processes are also arranged in a tree structure and the process tree is built in a hierarchical manner. When a process activates another process, the new process is located under the existing process in the process tree, the new process being defined as a "child" process of the existing process.

In addition to the process tree, the PDL engine builds another tree called the "protocol" tree. A protocol is a data structure that allows interaction between the application and the PDL machines. The protocol tree has a similar structure to that of the process tree, but not all of the elements of the process tree are recreated in the protocol tree.

The Test H450 API 506*a* (FIG. 4) implements createH450protocol, closeH450protocol, newH450RootChild, and newH450Child protocol functions. The createH450protocol function creates a new H450 protocol under the protocol root. The closeH450protocol closes the H450 protocol. The newH450RootChild is called when a new protocol is created under the protocol root. The newH450Child function is called when a new child is created under the message linker protocol.

The H450 test API 506*a* implements the following message functions: sendmessage450, newH450message, fillin, and recursion. The sendmessageH450 function is called when a new message is sent from the application to the H450 protocol. The newH450message is called if the applsend function is executed in the PDL script in order to send a message back to the application.

The fillin( ) and recursion( ) function to transform the tree-structured text-strings into valuetree structures and vice versa. The fillin( ) function receives the string as a parameter and fills in the various fields in the valuetree (XMLstring->valuetree). The recursion( ) function reads out the valuetree and parses its nodes and values into a textstring (valuetree->XMLstring).

Figure 5:
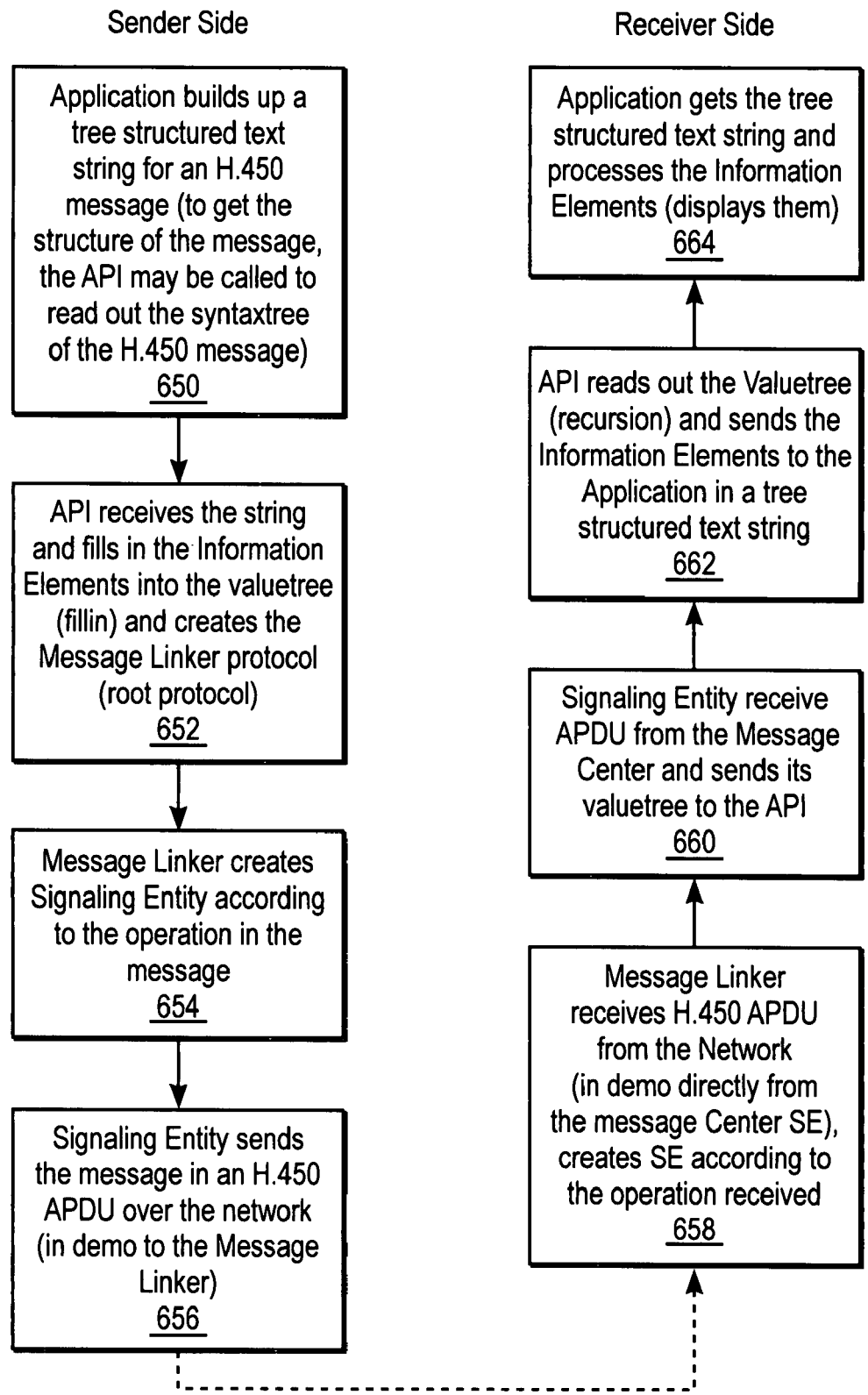
FIG. 5 is a flowchart illustrating operation of an implementation of the invention.

FIG. 5 is a flowchart illustrating operation of the embodiment of the invention. In a step 650, the application program builds up a tree-structured text string for an H.450 message. In a step 652, the API receives the text string and fills in the information elements into the value tree using the fillin( ) function and creates the Message Linker protocol, i.e., the root protocol. In a step 654, the Message Linker creates the Signaling Entity according to the operation in the message. In a step 656, the Signaling Entity sends the message in an H.450 APDU over the network. In a step 658, the Message Linker receives the H.450 APDU from the network and creates the Signaling Entity according to the operation received. In a step 660, the Signaling Entity receives the APDU from the Message Center and sends its value tree to the API. In a step 662, the API reads the valuetree using the recursions function and sends the information elements to the application in a tree-structured text string. Finally, in a step 664, the application receives the tree-structured text string and processes the information elements.

Figure 6:
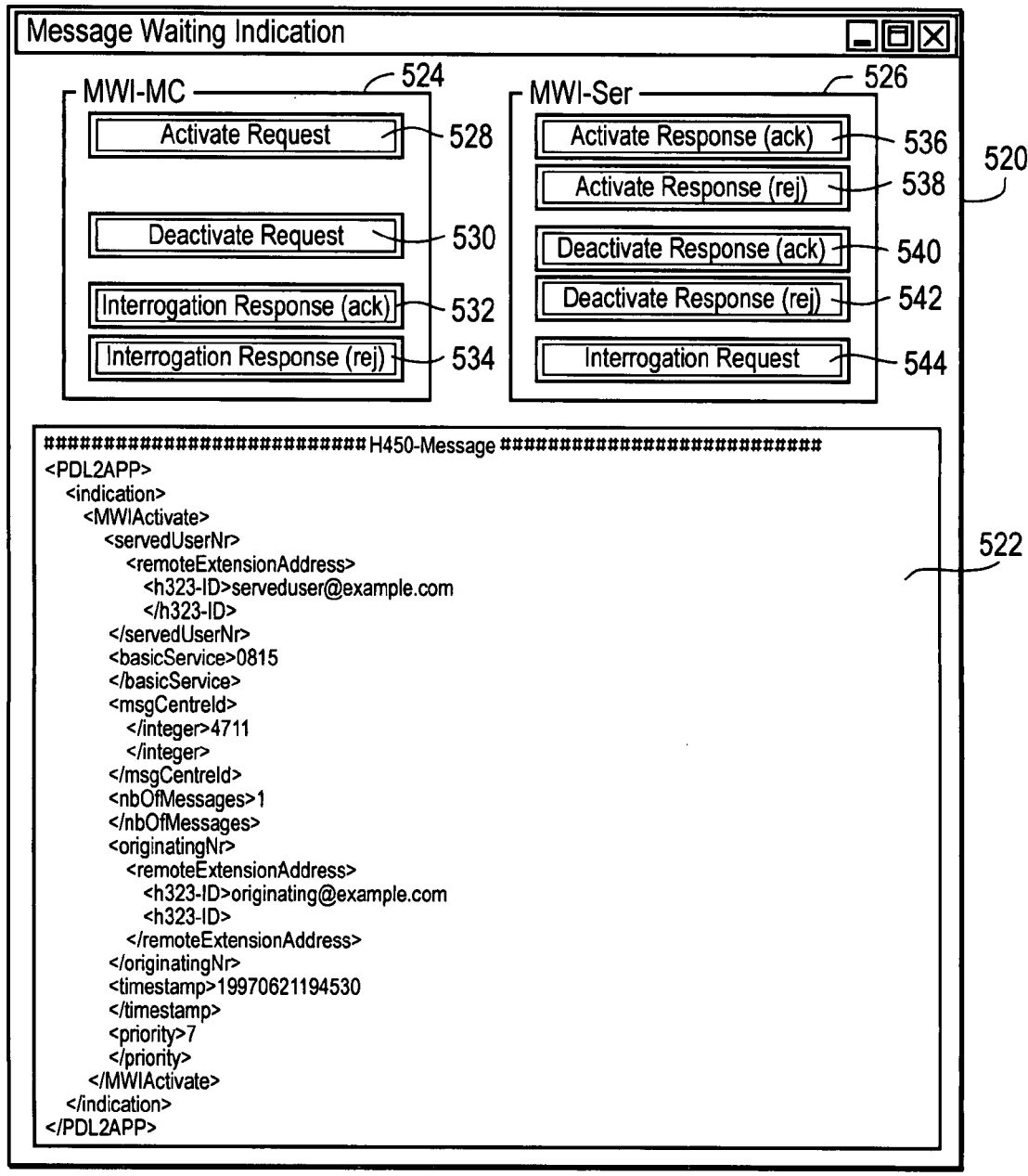
FIG. 6 is a graphical user interface according to an implementation of the present invention.

As noted above, one aspect of implementing the invention is a graphical user interface. FIG. 6 illustrates an exemplary graphical user interface 520 for the message waiting indication (MWI) test utility. As shown, the graphical user interface 520 includes a message center (MC) test control 524 and a served user test control 526. The GUI 520 further includes a text display region 522, used to display the ASN.1 text strings. The message center test control 524 includes an Activate Request button 528, a Deactivate Request button 530, an Interrogation Response (ack) button 532, and an Interrogation Response (rej) button 534. The served user test control 526 includes an Activate Response (ack) button 536, an Activate Response (rej) button 538, a Deactivate Response (ack) button 540, a Deactivate Response (rej) button 542, and an Interrogation Request button 544. The Message Waiting Indication (MWI) service activates an indication device (e.g. LED) on the served user endpoint if a message (e.g. voicemail) is waiting on the message center. Three operations can be sent over the network: Activation (to activate the MWI (turn on LED)); Deactivation (to deactivate the MWI (turn off LED)); Interrogation (the served user queries its MWI status).

The "XXX Request Buttons" (where XXX stands, e.g., for Activation) request to send the corresponding operation in an H.450 APDU to the peer entity. If the peer entity receives an indication of an operation (e.g. activation), it will respond by either acknowledging the request by pressing the "XXX Response (ack) Button" or by rejecting the request by pressing the "XXX Response (rej) Button".

In operation, a user can push a button, such as Activate Request 528. In response, a dialog window 600 (FIG. 7) is displayed. As shown, the dialog window 600 includes a plurality of data fields, and a SAVE button and a SEND button. Shown are servedUserNr, basicService, msgcenterId, nbOfMessages, originatingNr, timestamp, and priority fields.

Once filled in, by pressing the SAVE button, the values are stored in a h4507.ini file; by pressing SEND, the message is sent as a text string to the signaling entity.

H.450 Test Utility

Figure 8:
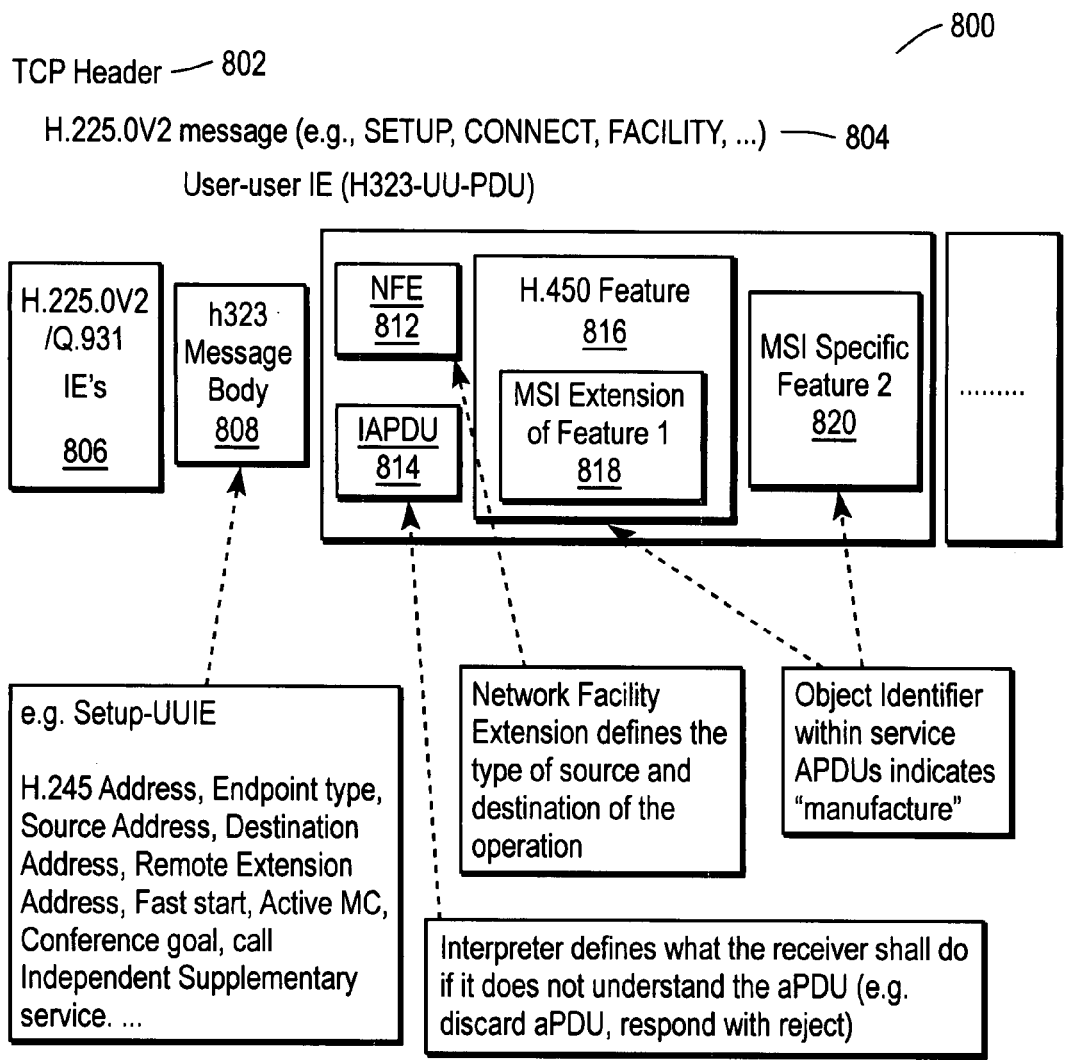
FIG. 8 is an exemplary H.225 packet.

As noted above, one aspect of the invention is an ability to send and receive any H.450 protocol data unit (PDU) in any H.225 message. More particularly, FIG. 8 illustrates an exemplary H.225 signaling message 800. As shown, the signaling message 800 includes a TCP header 802 and an H.225.0 V2 message 804. The H.225.0 V2 message 804 is representative of, for example, a SETUP, CONNECT, FACILITY, etc., message. The H.225.0 V2 message 804 includes H.225.0 V2/Q.931 information elements 806, setup information element 808 and an H.450 PDU 810. The H.450 PDU 810 includes a network facility extension (NFE) 812, an interpreter APDU (IAPDU) 814, an H.450 feature 816, an MSI extension 818, and an MSI specific feature 820. The NFE 812 defines the type of source and destination of the operation. The IAPDU 814 defines what the receiver is to do if it does not understand the command. The H.450 feature 816 is the APDU itself, and contains an MSI extension which identifies the manufacturer, as does the MSI specific feature 820.

As will be explained in greater detail below, the present invention allows the user to send test H.225 messages, with or without H.450 APDUs. If an H.450 APDU is to be sent, the user can select the specific H.450 APDU and any combination of information elements and network facility extension. The messages are then sent and received, as will be discussed in greater detail below.

Figure 9:
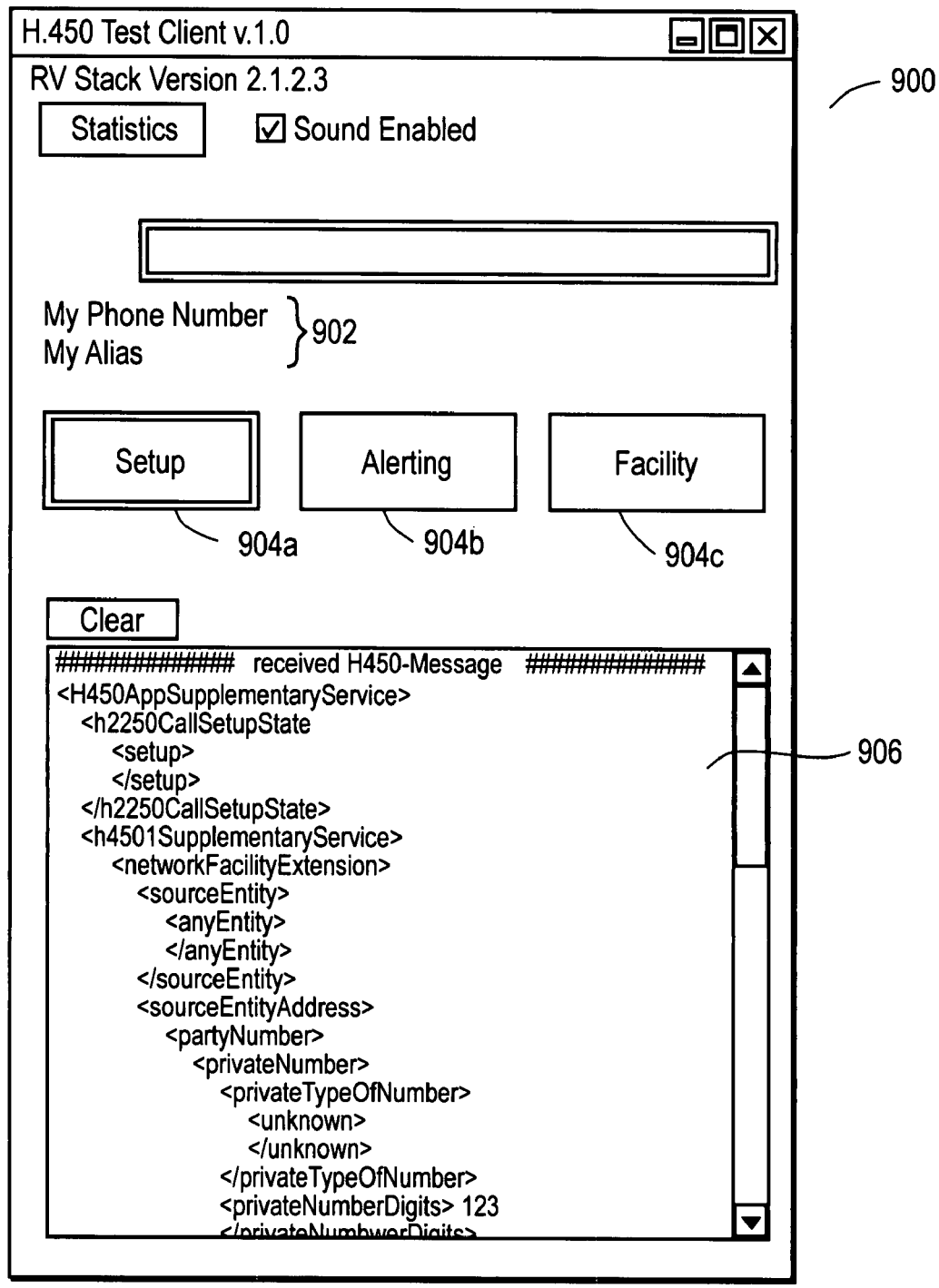
FIG. 9 and FIG. 10 are exemplary graphical user interfaces according to an implementation of the invention.

A graphical user interface is used to build the H.450 APDU. A graphical user interface in accordance with an implementation of the present invention is shown in FIG. 9. The GUI 900 allows the user to select the H.225 message which is to be tested. For example, the user can select SETUP 904a, ALERTING 904b, or FACILITY 904c buttons to select the corresponding H.225 message. One or more informational fields 902, such as called party and calling party phone number and alias may also be provided. Further, a list field 906 is provided to display the received H.450 message in an XML-like syntax, as generally described above. The list field 906 displays the H.225 message in which the H.450 APDU was received, and also displays all the H.450.1 information elements.

Figure 10:
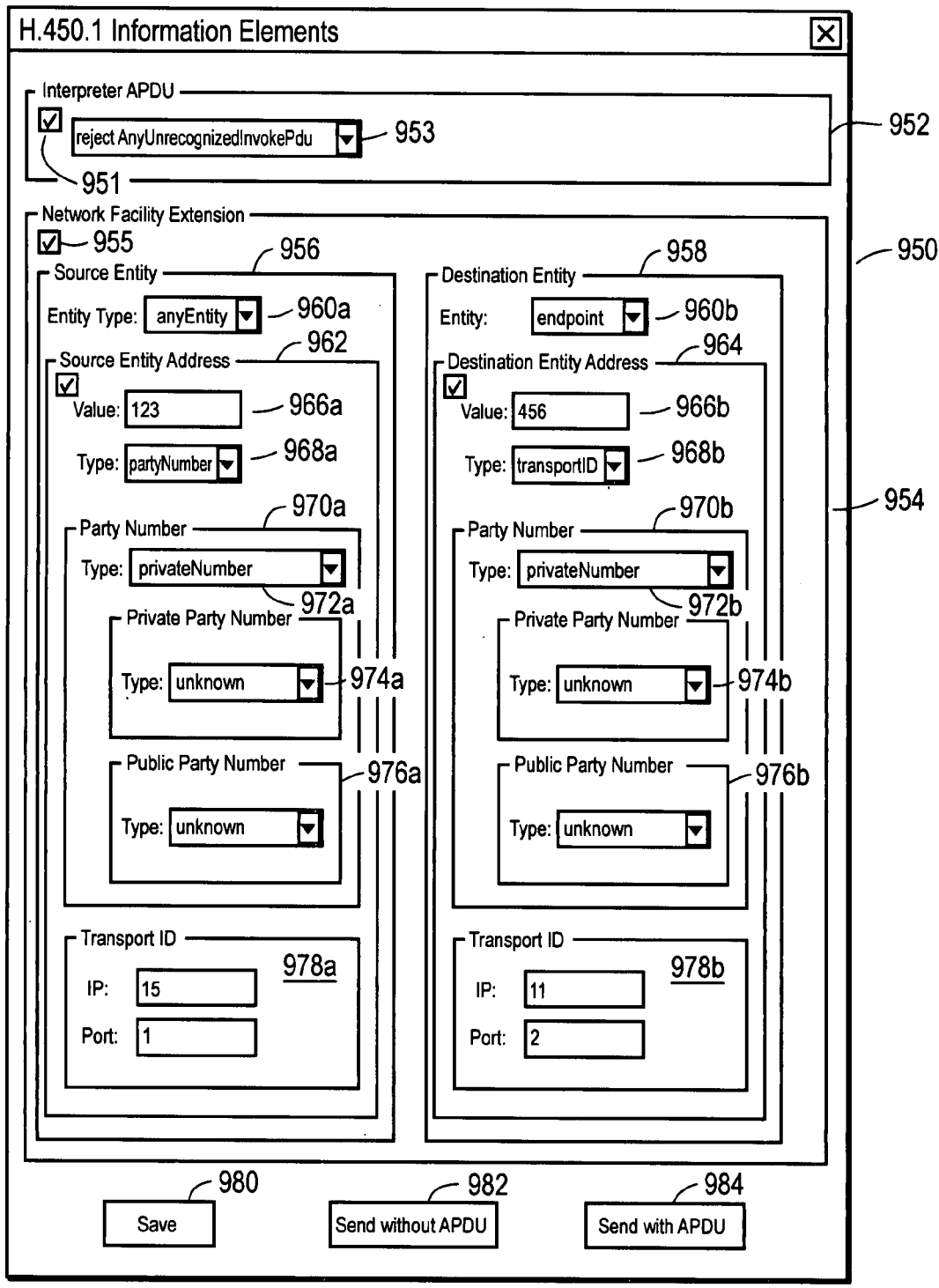

If the user decides to send an H.225 message, e.g., by clicking on SETUP, and after inputting the target number or name, the dialog box 950 of FIG. 10 is displayed. The dialog box 950 allows setting the H.450 information elements. Thus, the dialog box 950 includes an interpretation APDU select dialog 952 and a network facility extension select dialog 954. Using the pulldown 953, the user can select any of a plurality of interpretation APDUs. Alternatively, by deactivating the checkbox 951 the user can elect to send an H.225 message without the IAPDU. Similarly, the user can elect to send no network facility extension, by clicking on the checkbox 955.

The user can input a source and destination entity using the source entity dialog box 956 and destination entity dialog box 958, respectively. The source entity dialog allows the user to enter an entity type 960a and a source entity address 962. The source entity address 962 allows a user to input a value and address type 966a, 968a. As shown, a Party Number type has been selected. The party number dialog 970a allows the user to select a type of party number 972a and then, more specifically, the type of private 974a or public 976a party number. Alternatively, a transport address 978a may be supplied.

Similarly, the destination entity dialog can be used to select an entity type 960b, and includes a destination entity address dialog 964. The destination entity address dialog can be used to input a value 966b and select a destination entity address type 968b. As shown, a transported type has been selected. The transport ID, e.g., IP address and port, may be input using the dialog 978b. If a party number type had been selected, the user could input a party number type 972b and a private party number type 974b or public party number type 976b.

The entries may be saved by clicking on SAVE 980. Alternatively, the H.225 message may be sent without the H.450 APDU by clicking on button 982 or with the APDU by clicking on button 984.

Figure 12A:
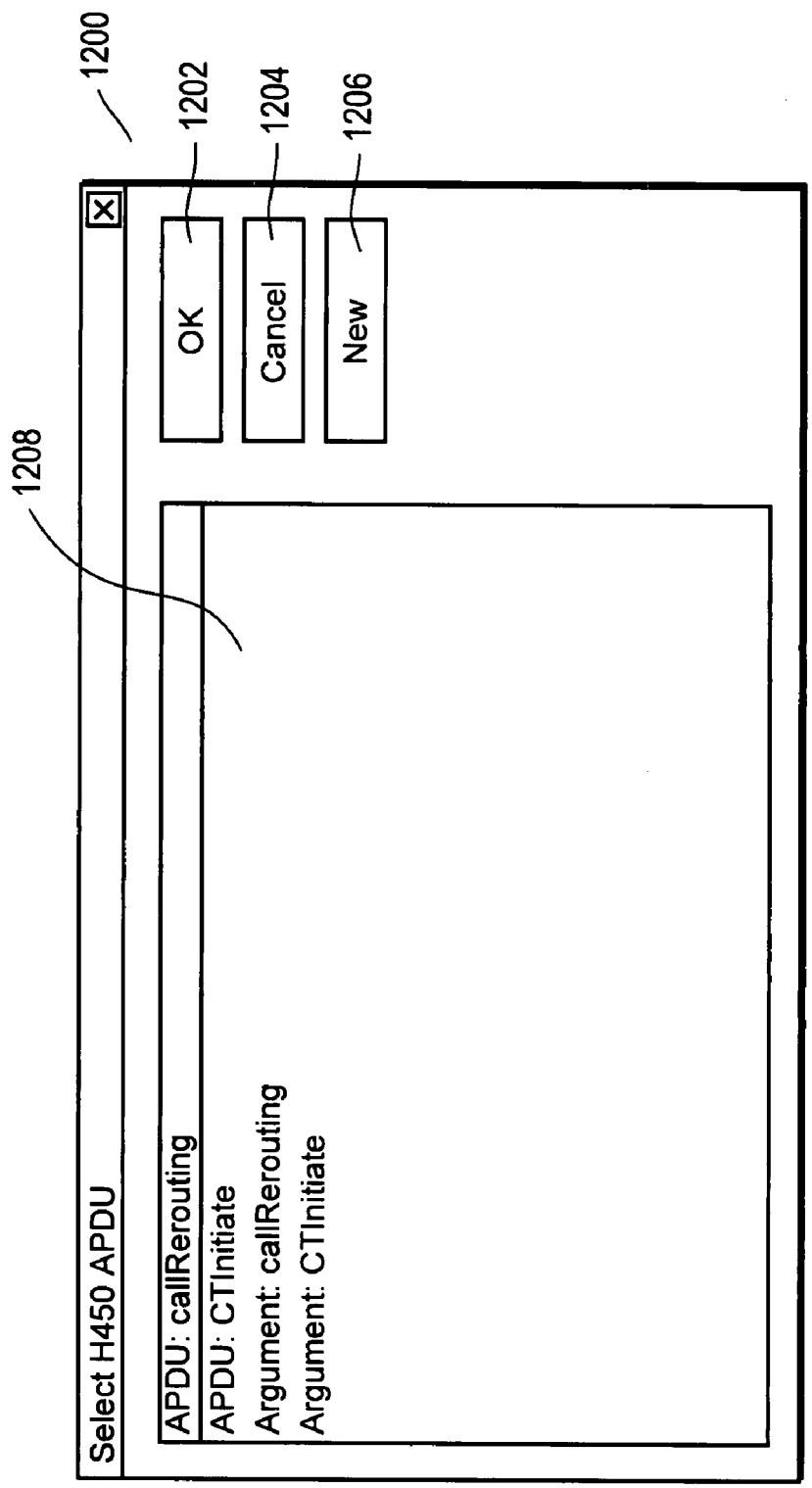
FIG. 12A and FIG. 12B are exemplary graphical user interfaces according to an implementation of the invention.
Figure 12B:
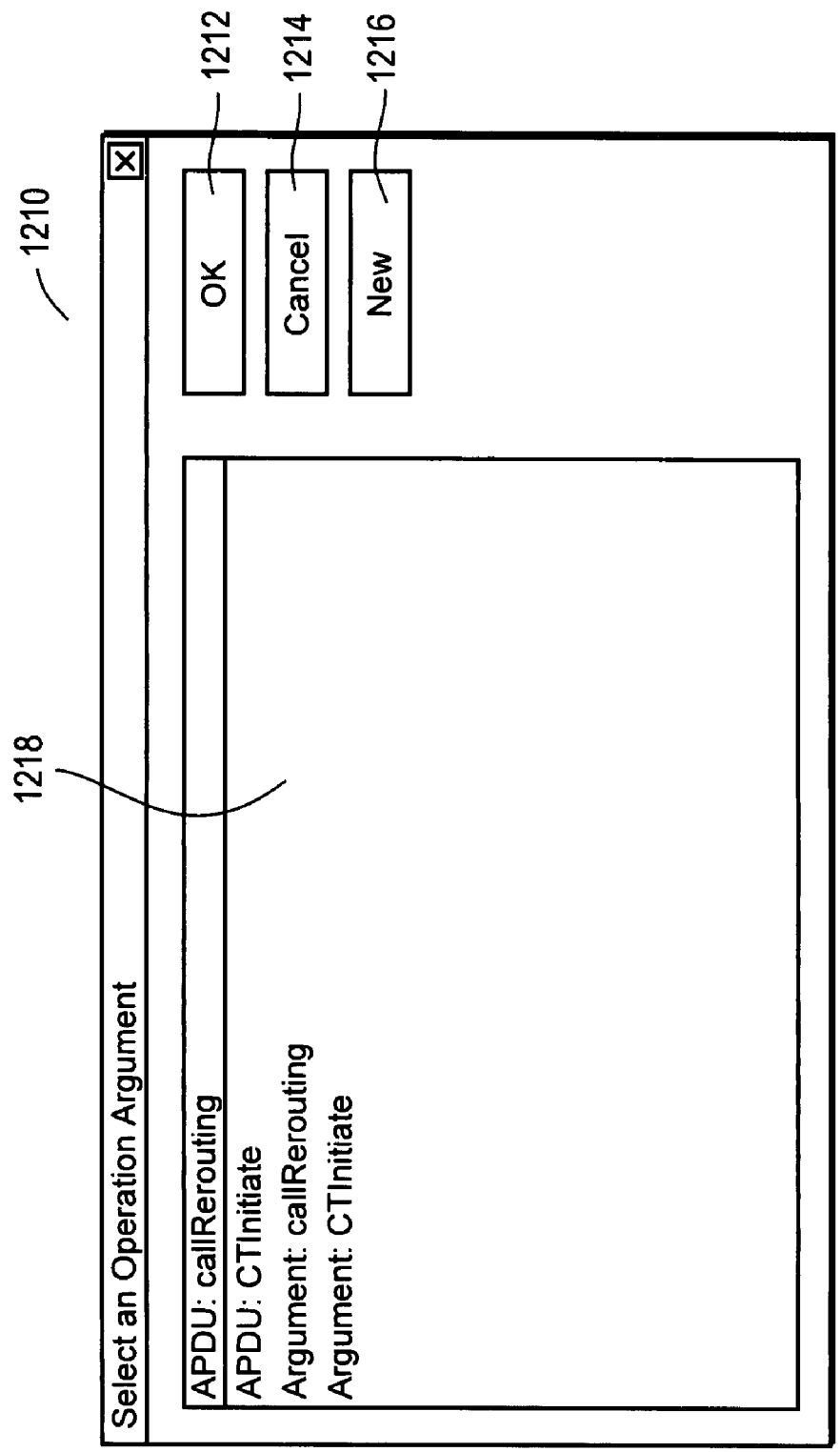

FIG. 12A and FIG. 12B illustrate graphical user interfaces according to another implementation of the invention. FIG. 12A illustrates a Select H450 APDU Dialog 1200. The Dialog 1200 appears, for example, when Setup (FIG. 9) is clicked. The Select H450 APDU Dialog includes OK button 1202, Cancel button 1204, and New button 1206, as well as List dialog 1208. By clicking on the Cancel button 1204, the user can decide not to send an APDU with this H.225 message, in which case, the Dialog 1200 will close and the message will be sent immediately. Clicking the New button 1206 will start an H450 Builder Application, as will be explained in greater detail below, which allows the building of a new H450 APDU and adding it to the List dialog 1208. After the APDU is created and saved and the user closes the APDU Builder application, the List dialog 1208 is refreshed to show the new APDU.

If the user highlights an APDU in the List dialog 1208 and clicks the OK button 1202, the Select Operation Argument Dialog 1210 (FIG. 12B) appears. The Select Operation Argument Dialog 1210 includes an OK button 1212, a Cancel button 1214, a New button 1216, and a List Dialog 1218.

By clicking the Cancel button 1214, the user can decide not to send an Argument with this APDU, which will close the dialog and send the message immediately. Clicking on New 1216 will start the H450 Builder Application which allows the user to build a new argument and add it to the List dialog 1218. Once the new Argument is created and the Builder is exited, the List 1218 is refreshed.

If the user highlights an Argument in the List 1218 and clicks the OK button 1212, the H.450 Client processes all necessary RAS procedures and send the setup message together with the H.450 APDU to the specified destination.

Figure 13:
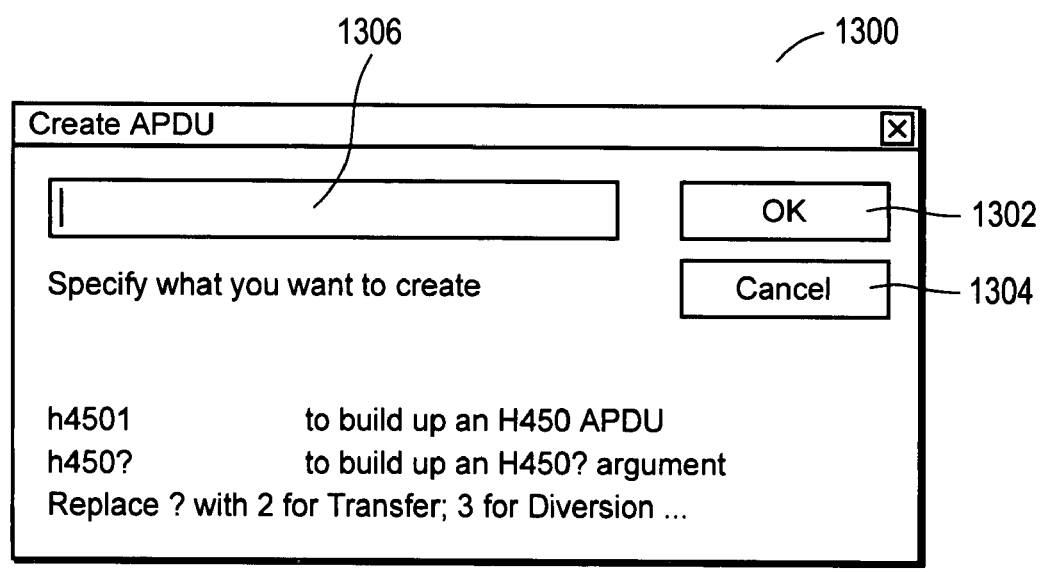
FIG. 13 is an exemplary graphical user interface according to an implementation of the invention.
Figure 14:
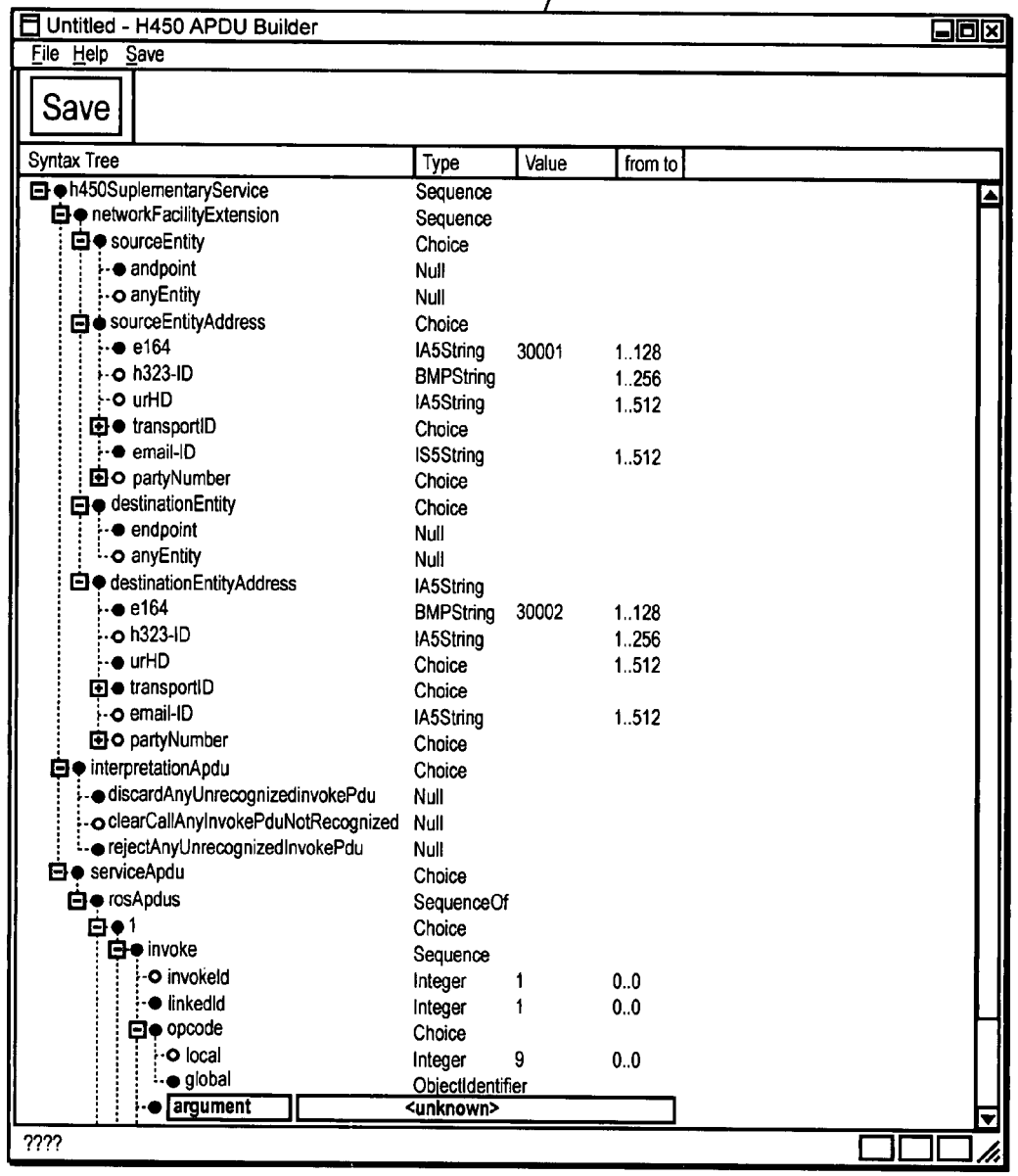
FIG. 14 is a diagram of a graphical user interface according to an implementation of the invention.

Operation of the H450 Builder is shown in greater detail with reference to FIG. 13 and FIG. 14. More particularly, FIG. 13 illustrates a Create APDU dialog 1300. The Create APDU dialog 1300 includes an OK button 1302, a Cancel button 1304 and an entry dialog 1306. If the user presses Cancel 1304, the application terminates.

Otherwise, at startup, the Builder first asks what type of APDU the user wants to create. The user does so by typing in the appropriate APDU in the Entry dialog 1306. The user can type in "h4501" to build an H.450 APDU or "h450x" to build an argument, where x refers to the number of the H.450 recommendation. When the user clicks "OK" 1302, the Builder GUI (FIG. 14) appears.

The APDU Builder 1400 displays a tree control, which displays the whole syntaxtree of the H450 APDU. By clicking on the nodes of the tree, the user can select or deselect nodes for building. If a leaf node (i.e., an end node) is selected, a dialog box (not shown) appears for the user to fill in data.

For example, FIG. 14 illustrates a syntaxtree for an H4501 supplementary service. The user can select network facility extension, InterpretationAPDU, and serviceAPDU nodes. If the user selects networkfacilityextension, the user can choose a SourceEntity, a SourceEntityAddress, and a DestinationEntity and DestinationEntityAddress. If the user selects destinationEntityAddress, a variety of choices are available, such as H323-ID, url-ID, and the like. The user can select one and fill in the appropriate value.

Figure 11:
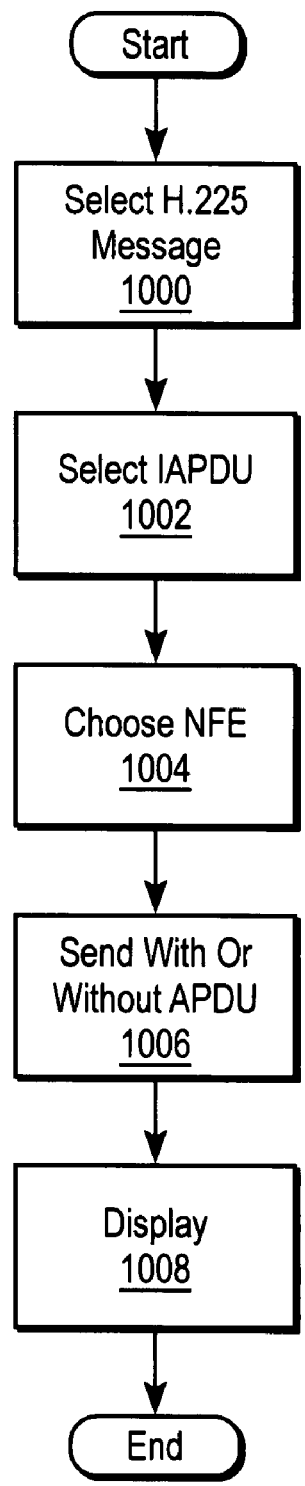
FIG. 11 is a flowchart illustrating operation of an implementation of the invention.

Turning now to FIG. 11, a flowchart illustrating operation of an implementation of the invention is shown. In step 1000, the user uses GUI 900 (FIG. 9) to select a particular H.225 message for sending. In a step 1002, a selection of the IAPDU may be made, using the checkbox 951 and the dialog 953 (FIG. 10) or the Select APDU, Select Operation Argument dialogs (FIGS. 12A-12B). In a step 1004, a selection of the Network Facility Extension may be made using the checkbox 935 and the dialog 954 or the Builder 1400. As discussed above, this can include selection of a variety of source and destination entities, and addresses, including party numbers or transport IDs. In a step 1006, the user can elect to save the filled in information or send the H.225 message with or without the APDU, using buttons 980, 984, or 984 (or the dialogs 1200, 1210, 1300, 1400). In a step 1005, the H.450 IAPDU is displayed.

The invention described in the above detailed description is not intended to be limited to the specific form set forth herein, but is intended to cover such alternatives, modifications and equivalents as can reasonably be included within the spirit and scope of the appended claims.

What is claimed is:

1. A system including a processor and a computer program storage medium storing an application program executable by the processor, said application program comprising:
   an H.323-compatible telecommunications program; and
   a test program configured to allow a user to selectively build and view H.450 APDUs, provide said H.450 APDUs to said H.323-compatible telecommunications program, and receive corresponding H.450 APDUs from destination systems.

2. A system in accordance with claim 1, said test program including a graphical user interface (GUI) configured to allow a user to input predetermined H.225 messages.

3. A system in accordance with claim 2, said GUI configured to allow a user to fill in H.225 information fields.

4. A system in accordance with claim 3, said GUI configured to allow a user to input a predetermined network facility extension.

5. A system in accordance with claim 4, said GUI configured to display said H.225 message in an XML-like format.

6. A method, comprising:
   providing an H.323-compatible telecommunications program; and
   providing a test program configured to allow a user to selectively build and view H.450 APDUs, provide said H.450 APDUs to said H.323-compatible telecommunications program, and receive corresponding H.450 APDUs from destination systems.

7. A method in accordance with claim 6, said test program including a graphical user interface (GUI) configured to allow a user to input predetermined H.225 messages.

8. A method in accordance with claim 7, said GUI configured to allow a user to fill in H.225 information fields.

9. A method in accordance with claim 8, said GUI configured to allow a user to input a predetermined network facility extension.

10. A method in accordance with claim 9, said GUI configured to display said H.225 message in an XML-like format.

11. A system including a processor and a computer program storage medium storing an application program executable by the processor, said application program, comprising:
    a multimedia telecommunications program; and
    a test program configured to allow a user to selectively build and view supplementary service APDUs, provide said supplementary service APDUs to said multimedia telecommunications program, and receive corresponding supplementary service APDUs from destination systems.

12. A system in accordance with claim 11, said test program including a graphical user interface (GUI) configured to allow a user to input a predetermined network facility extension.

* * * * *